United States Patent
Starovoitov

(10) Patent No.: US 8,527,488 B1
(45) Date of Patent: Sep. 3, 2013

(54) NEGATIVE REGULAR EXPRESSION SEARCH OPERATIONS

(75) Inventor: Alexei Starovoitov, Los Gatos, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 271 days.

(21) Appl. No.: 12/832,862

(22) Filed: Jul. 8, 2010

(51) Int. Cl.
*G06F 17/30* (2006.01)

(52) U.S. Cl.
USPC ............ 707/706; 707/712; 707/763; 707/769

(58) Field of Classification Search
USPC ................... 707/706, 712, 763, 769
See application file for complete search history.

(56) References Cited

U.S. PATENT DOCUMENTS

| | | |
|---|---|---|
| 5,278,981 A | 1/1994 | Kawaguchi et al. |
| 5,440,715 A | 8/1995 | Wyland |
| 5,452,451 A | 9/1995 | Akizawa et al. |
| 5,497,488 A | 3/1996 | Akizawa et al. |
| 5,712,971 A | 1/1998 | Stanfill et al. |
| 6,246,601 B1 | 6/2001 | Pereira |
| 6,249,467 B1 | 6/2001 | Pereira et al. |
| 6,252,789 B1 | 6/2001 | Pereira et al. |
| 6,275,426 B1 | 8/2001 | Srinivasan et al. |
| 6,521,994 B1 | 2/2003 | Huse et al. |
| 6,560,670 B1 | 5/2003 | Ichiriu |
| 6,751,755 B1 | 6/2004 | Sywyk et al. |
| 6,785,677 B1 | 8/2004 | Fritchman |
| 6,865,098 B1 | 3/2005 | Ichiriu et al. |
| 6,892,237 B1 | 5/2005 | Gai et al. |
| 7,069,386 B2 | 6/2006 | Stefan et al. |
| 7,134,143 B2 | 11/2006 | Stellenberg et al. |
| 7,225,188 B1 * | 5/2007 | Gai et al. ................. 1/1 |
| 7,353,332 B2 | 4/2008 | Miller et al. |
| 7,529,746 B2 | 5/2009 | Ichiriu et al. ............. 707/5 |
| 7,539,031 B2 | 5/2009 | Ninan et al. ............ 365/49.1 |
| 7,539,032 B2 | 5/2009 | Ichiriu et al. ........... 365/49.1 |
| 7,624,105 B2 | 11/2009 | Ichiriu et al. ............. 707/4 |
| 7,636,710 B2 * | 12/2009 | Borthakur et al. ............. 1/1 |
| 7,643,353 B1 | 1/2010 | Srinivasan et al. |
| 7,644,080 B2 | 1/2010 | Mammen et al. ........... 707/6 |
| 7,656,716 B1 * | 2/2010 | Srinivasan et al. ...... 365/189.02 |
| 7,660,140 B1 | 2/2010 | Joshi et al. |
| 7,787,275 B1 * | 8/2010 | Birman et al. ........... 365/49.1 |
| 7,821,844 B2 | 10/2010 | Srinivasan et al. ...... 365/189.02 |

(Continued)

OTHER PUBLICATIONS

A versatile Data String-Search VLSI; Hirata et al.; IEEE Journal of Solid-State Circuits, vol. 23, No. 2, Apr. 1988, 7 pgs.

(Continued)

*Primary Examiner* — Thanh-Ha Dang
(74) *Attorney, Agent, or Firm* — Sterne, Kessler, Goldstein & Fox P.L.L.C.

(57) ABSTRACT

A content search system determines whether an input string matches a negative regular expression that includes a negative pattern and an optional positive pattern. If the input string matches the positive pattern and does not match the negative pattern, a match between the input string and the negative regular expression is indicated. The positive pattern and the negative pattern may be compared to the input string in a single pass of the input string. The content search system may be implemented in a content addressable memory (CAM) device. The negative regular expression may specify a particular portion of the input string, such as a range of characters or bytes of a data packet, in which the negative pattern should not match for a match between the negative regular expression and the input pattern to be indicated.

24 Claims, 8 Drawing Sheets

(56) References Cited

U.S. PATENT DOCUMENTS

| | | | |
|---|---|---|---|
| 7,826,242 B2 | 11/2010 | Joshi et al. | 365/49.17 |
| 7,831,765 B2* | 11/2010 | Regev et al. | 711/108 |
| 7,872,890 B1 | 1/2011 | Starovoitov | 365/49.17 |
| 7,876,590 B2 | 1/2011 | Joshi et al. | 365/49.17 |
| 7,895,611 B2* | 2/2011 | Grabarnik et al. | 719/328 |
| 7,912,705 B2* | 3/2011 | Wasson et al. | 704/9 |
| 7,916,510 B1 | 3/2011 | Starovoitov et al. | 365/49.1 |
| 7,924,590 B1* | 4/2011 | Starovoitov et al. | 365/49.17 |
| 8,051,085 B1 | 11/2011 | Srinivasan et al. | 707/737 |
| 8,069,304 B2* | 11/2011 | Panchalingam et al. | 711/108 |
| 2004/0177319 A1 | 9/2004 | Horn | |
| 2006/0215432 A1 | 9/2006 | Wickeraad et al. | |
| 2007/0022246 A1* | 1/2007 | Regev et al. | 711/108 |
| 2008/0033953 A1* | 2/2008 | Vaithyanathan et al. | 707/9 |
| 2008/0065822 A1* | 3/2008 | Murukanandam et al. | 711/108 |
| 2008/0071757 A1* | 3/2008 | Ichiriu et al. | 707/4 |
| 2008/0071779 A1* | 3/2008 | Mammen et al. | 707/6 |
| 2008/0071781 A1* | 3/2008 | Ninan et al. | 707/6 |
| 2008/0133517 A1* | 6/2008 | Kapoor et al. | 707/6 |
| 2008/0212581 A1 | 9/2008 | Miller et al. | 370/389 |
| 2009/0089287 A1* | 4/2009 | Roberts et al. | 707/6 |
| 2009/0119275 A1* | 5/2009 | Chen et al. | 707/5 |
| 2010/0333167 A1* | 12/2010 | Luo et al. | 726/1 |

OTHER PUBLICATIONS

Efficient String Matching: An Aid to Bibliographic Search; Programming Techniques; A. Aho and M. Corasick; Bell Laboratories; 1975, 8 pgs.

Fast Routing Table Lookup Using CAMs; McAuley et al.; Morristown, NJ, USA; 1993; 10 pgs.

Gigabit Rate Packet Pattern-Matching Using TCAM; Fang Yu, Randy Katcz EECS Dept. UC Berkeley, T.V. Lakshman, Bell Laboratories; date at least earlier than Jun. 3, 2008; 10 pgs.

High Speed Pattern Matching for Network IDS/IPS; Alicherry et al.; Lucent Bell Laboratories; IEEE, 2006, 10 pgs.

Small Forwarding Tables for Fast Routing Lookups; Degermark et al.; Lulea University of Technology; Lulea, Sweden; 1997; 12 pgs.

* cited by examiner

NEGATIVE REGULAR EXPRESSION SEARCH OPERATIONS

TECHNICAL FIELD

The present invention relates generally to the field of regular expression search operations, and more specifically, to search operations that identify input strings that match a negative regular expression.

BACKGROUND OF RELATED ART

Regular expression search operations are employed in various applications including, for example, intrusion detection systems (IDS), virus protections, policy-based routing functions, internet and text search operations, document comparisons, and so on. A regular expression can simply be a word, a phrase or a string of characters. For example, a regular expression including the string "gauss" would match data containing gauss, gaussian, degauss, etc. More complex regular expressions include metacharacters that provide certain rules for performing the match. Some common metacharacters are the wildcard ".", the alternation symbol "I', and the character class symbol "[ ]." Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed exactly 2 instances of any character followed by the character "b" including, for example, the input strings "abbb," adgb," "a7yb," "aaab," and so on.

While regular expressions are helpful in determining whether an input string matches a pattern, it can be difficult, or even impossible, to use regular expressions to identify input strings that do not match certain patterns. For example, access control lists (ACLs) are classification filters that enable network administrators to control the processing functions applied to incoming packets in packet-switched networks (e.g., to permit or deny application of a given feature to an incoming packet). Typically, an ACL is embodied by number of regular expressions that can be stored in a search engine. During processing of each packet in a data stream, a search key is constructed either from selected fields within the packet header (e.g., source address, destination address, source port, destination port, protocol, etc.) or from the packet payload (e.g., for deep content inspection operations), and then compared with the regular expressions stored in the search engine to determine what action is to be taken. More specifically, if the search key matches a policy statement (also referred to as an access control entry (ACE)) stored in the search engine, then the action corresponding to the matching entry is taken. Thus, because conventional search engines search for matching patterns, conventional search engines deployed in packet classification systems typically store a statement or entry for every combination of desired packet header field values associated with a particular action, which in turn consumes significant storage area. Accordingly, it would be desirable to reduce the amount of storage area required to implement search operations using regular expressions (e.g., for packet filtering and classification operations).

BRIEF DESCRIPTION OF THE DRAWINGS

Present embodiments are illustrated by way of example and not intended to be limited by the figures of the accompanying drawings, where.

Like reference numerals refer to corresponding parts throughout the drawing figures.

DETAILED DESCRIPTION

Figure 1:
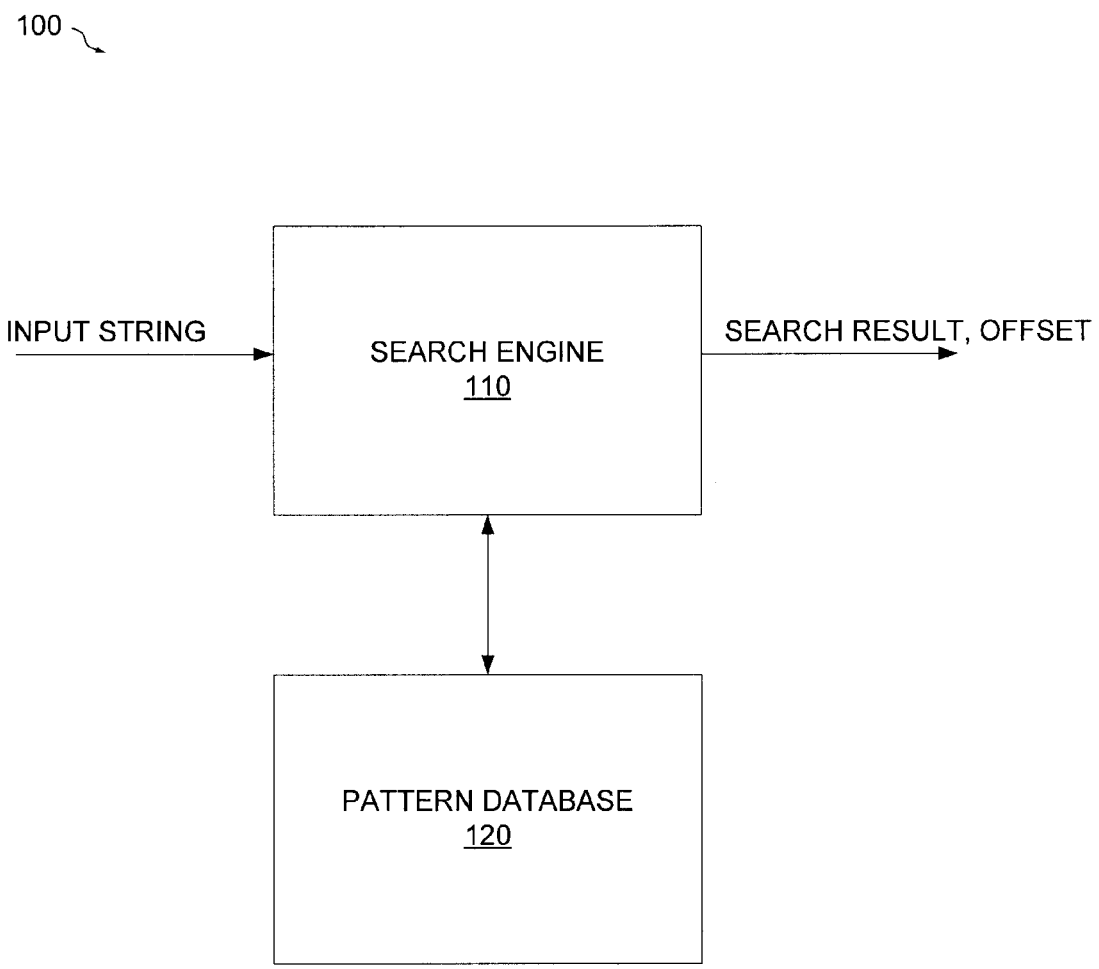
FIG. 1 is a block diagram of one embodiment of a content search system according to one embodiment.

In the following description, numerous specific details are set forth such as examples of specific components, circuits, and processes to provide a thorough understanding of the present invention. In the following description, for purposes of explanation, specific nomenclature is set forth to provide a thorough understanding of the present invention. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

A method and apparatus are disclosed for determining whether an input string of characters matches a negative regular expression. In accordance with the present embodiments, a negative regular expression is defined as a regular expression that includes at least one negative pattern and zero or more positive patterns, wherein the positive pattern is defined as a pattern that a portion of the input string matches and the negative pattern is defined as a pattern that a portion of the input string does not match. Thus, for an input string to match a negative regular expression as defined by the present embodiments, the input string must match all positive patterns identified by the negative regular expression and must not match any negative patterns identified by the negative regular expression.

Negative regular expressions may be used by content search systems, such as content addressable memory (CAM) devices, to search input strings of any size and complexity to determine whether an input string matches a number of positive patterns while not matching a number of negative patterns. Previous approaches to determine whether an input string does not match a specified pattern are time-consuming and complex because they typically involve determining whether the input string matches every possible pattern other than the specified pattern.

More specifically, performing negative regular expression search operations in packet filtering and classification operations can significantly reduce the size of the ACL(s) because a single negative regular expression can be used to identify search keys that both match a number of positive patterns and do not match a number of negative patterns. For example, if it is desired to identify search keys that match a first ACL pattern (e.g., a specified source address) and that do not match a second ACL pattern (e.g., a specified destination address), then the search keys can be compared in a single pass with a negative regular expression that includes the first ACL pattern as a positive pattern and includes the second ACL pattern as a negative pattern. Thus, a search engine configured in accordance with the present embodiments compares a search key with both the positive pattern(s) and the negative pattern(s) defined by the negative regular expression, and reports a match condition only if the search key matches the first ACL pattern and does not match the second ACL pattern. Accordingly, if a portion of the search key matches the second ACL pattern (the negative pattern) defined by the negative regular expression, then the search engine indicates a mismatch condition between the search key and the negative regular expression.

This is in contrast with conventional search operations that indicate a match condition if the search key matches all patterns defined by the regular expression. For example, to determine whether a search key matches the first ACL pattern and does not match the second ACL pattern using conventional regular expression search operations, the search engine is typically configured to store the first ACL pattern and a plurality of other patterns that collectively represent all patterns other than the second ACL pattern. Then, during search operations, if the search key matches the first ACL pattern and any one of the plurality of other patterns, a match condition is reported. Otherwise, a mismatch condition is reported. Thus, in contrast to negative regular expression search operations performed in accordance with present embodiments, conventional regular expression search operations store a plurality of other patterns that collectively represent a negative pattern.

A variety of different types of content search systems may use negative regular expressions. Content search systems, as broadly used herein, refer to any type of computerized system that determines whether an input string matches one or more stored patterns. For example, FIG. 1 shows a block diagram of one embodiment of a content search system 100 that includes a search engine 110 and a pattern database 120. The search engine 110 receives one or more input strings, consults pattern database 120 to identify one or more stored patterns, and then compares the input strings with the one or more stored patterns. The search engine 110 then outputs the results of the comparison, and optionally, outputs an offset value that indicates where a matching pattern was found in the input string.

Content search systems may be implemented in hardware, software, or a combination of hardware and software. For example, the content search system 100 of FIG. 1 can be implemented using a CAM device. Certain CAM arrays may be implemented exclusively in hardware. Other CAM arrays may be implemented using both hardware and software, e.g., the CAM array may use a software program to implement a nondeterministic finite-state machine (FSA) and may use hardware to implement a deterministic finite-state machine (DFA).

For some embodiments, search engine 110 can include a CAM array of the type described in commonly-owned U.S. Pat. No. 7,643,353, which is incorporated by reference herein. For CAM arrays of the type described in U.S. Pat. No. 7,643,353, the rows of CAM cells are each selectively connected to a programmable routing structure (PRS) that can be configured to selectively route the match signal from any CAM row as an input match signal to itself and/or to any number of other arbitrarily selected CAM rows at the same time. The CAM array may also include a number of counter circuits that can be selectively connected to each other and/or to any number of the CAM rows by the PRS. In this manner, CAM arrays of the type disclosed in U.S. Pat. No. 7,643,353 can be configured to implement search operations for complex regular expressions having various metacharacters, quantifiers, and/or character classes. More specifically, to store a complex regular expression in the CAM array disclosed in U.S. Pat. No. 7,643,353, the CAM array's PRS is programmed to implement a non-deterministic finite automaton (NFA) that embodies the complex regular expression, thereby mapping the NFA into the CAM array hardware. During search operations, the logic states of the match lines are indicative of the states of the corresponding NFA (e.g., where an asserted match line indicates that the corresponding state of the NFA is active, and a de-asserted match line indicates that the corresponding state of the NFA is inactive). In this manner, the match results stored in the CAM array's match latches can be used to indicate whether corresponding states of the NFA are active or inactive, thereby providing current state information for the NFA.

For other embodiments, content search system 100 of FIG. 1 can be implemented by a software application.

To illustrate how negative regular expressions may be used by content search system 100 to identify negative patterns, consider the following three examples.

Example 1

^.*(?^abcd)$

Example 1 depicts a negative regular expression that includes the negative pattern "abcd" and includes no positive patterns. Content search system 100 will indicate that an input string matches the negative regular expression of Example 1 if the input string does not contain the pattern "abcd." For example, the input string "netlogic" will match the negative regular expression of Example 1, while the input string "netlogicabcd" will not match the negative regular expression of Example 1.

The negative regular expression of Example 1 is expressed in the Perl programming language, although negative regular expressions may be expressed using any number of other languages. The Perl programming language shall be used in all examples in this application, as Perl is a language that is widely used for performing regular expression search operations.

The negative pattern "abcd" in Example 1 is identified as a negative pattern by virtue of a negative pattern identifier appearing before the negative pattern. As used herein, the negative pattern identifier is the operator "?^". Applicant notes that the operator "?^" is not a recognized operator in the Perl programming language, and therefore content search systems that perform negative regular expression search operations are, in accordance with the present embodiments, configured to support the negative pattern identifier "?^". In this and the following examples, the negative pattern identifier is implemented using the negative pattern identifier "?^", although those skilled in the art will appreciate that the particular identifier chosen is a matter of preference, as any character, token, or identifier may be used as a negative pattern identifier if it is treated as such by a content search system.

Other characters in the expression of Example 1 are not pertinent to the identification of the negative patterns. In the Perl programming language, the characters ".*" will match zero or more occurrences of any number of characters. In effect, the character ".*" will match anything. The character $ is a metacharacter that matches the end of the input string.

Example 2 aaaa.*(?^xxx)abcd

The negative regular expression of Example 2 includes the negative pattern "xxx" and the two positive patterns "aaaa" and "abcd." An input string will match the negative regular expression of Example 2 if the input string does not contain the string "xxxx" between the strings "aaaa" and "abcd." Thus, for an input string to match the negative regular expression of Example 2, the input string must contain both the positive patterns "aaaa" and "abcd" (in that order), but must not contain the negative pattern "xxx" between the two positive patterns. For example, the input strings "aaaanetlogicabcd" and "aaaaabcdxxx" will match the negative regular expression of Example 2, while the input string "aaaaxxxabcd" will not match the negative regular expression of Example 2.

Figure 2A:
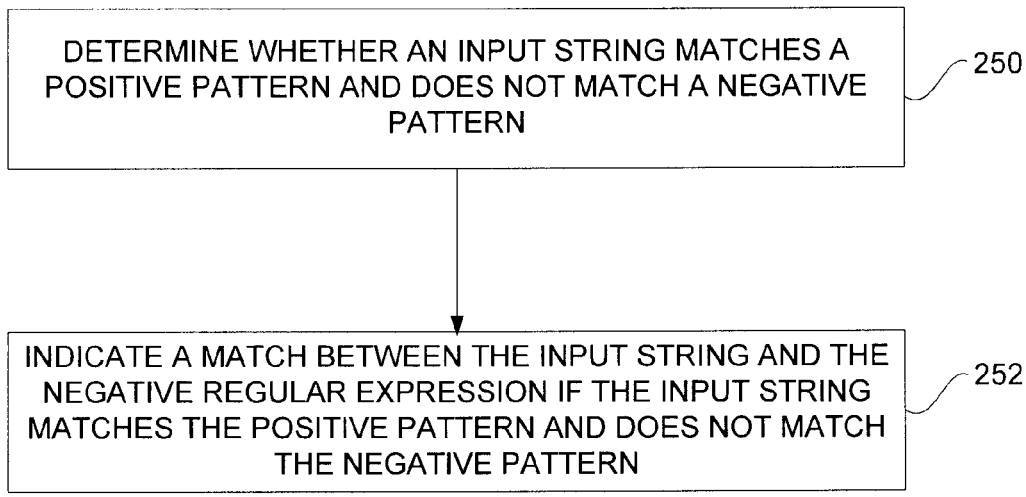
FIG. 2A is an illustrative flowchart depicting a negative regular expression search operation in accordance with some embodiments.

FIG. 2A depicts the high-level functional steps content search system 100 performs in comparing an input string to the negative regular expression of Example 2. In step 250, content search system 100 determines whether the input string matches any positive patterns identified by the negative regular expression and whether the input string does not match any negative patterns identified by the negative regular expression.

As an example, each of the following input strings match the negative regular expression of Example 2: (a) "aaaaabcd," (b) "aaaaaaaaaaabbbbabcd," (c) "aaaaxxabcd," and (d) "aaaaabcdxxx". Each of these input strings matches (depicted in step 252 of FIG. 2A) the negative regular expression of Example 2 because each input string contains both the positive strings "aaaa" and "abcd," and in that order, but does not include the negative pattern "xxx" between the positive strings "aaaa" and "abcd".

As another example, each of the following input strings do not match the negative regular expression of Example 2: (a) "aaaaxxxabcd," (b) "aaaa1111xxxxxxxxxxxxxxxabcdefg," (c) "elephant," and (d) "abcefg". Each of these input string does not match the negative regular expression of Example 2 because each input string either (a) does not contain both the positive strings "aaaa" and "abcd," and in that order, or (b) includes the negative pattern "xxx" between the positive strings "aaaa" and "abcd".

The negative regular expression of Example 2 may used in a variety of different contexts. To illustrate one example, the negative regular expression of Example 2 may be used to quickly identify XML documents that contains a set of XML tags without having a particular attribute value or certain associated content. For example, consider the following XML document:

<body>
<paragraph font="Times New Roman">
This is a very short example.
</paragraph>
</body>

If the negative regular expression "body.*(?^oatmeal)/body" is compared with the above XML document, a match is indicated because "oatmeal" does not appear between the tags "body" and "/body." Similarly, if the negative regular expression "paragraph.*(?^Helvetica)/paragraph" is used to search a corpus of XML documents, then all XML documents which contain paragraph XML tags but do not have the attribute value of Helvetica in paragraph XML tags will be identified as a match.

Example 3

^.{100}(?^abcd)

The negative regular expression of Example 3 includes the negative pattern "abcd." Content search system 100 will indicate a match with an input string if the first 100 characters (e.g., bytes) of the input string do not match the negative pattern "abcd." In this example, the first 100 bytes of the input string are identified by the quantifier {100}, although as explained above, any other character, token, or identifier may be used to identify a particular number of bytes or portion of an input string if it is recognized as such by the content search system.

Figure 2B:
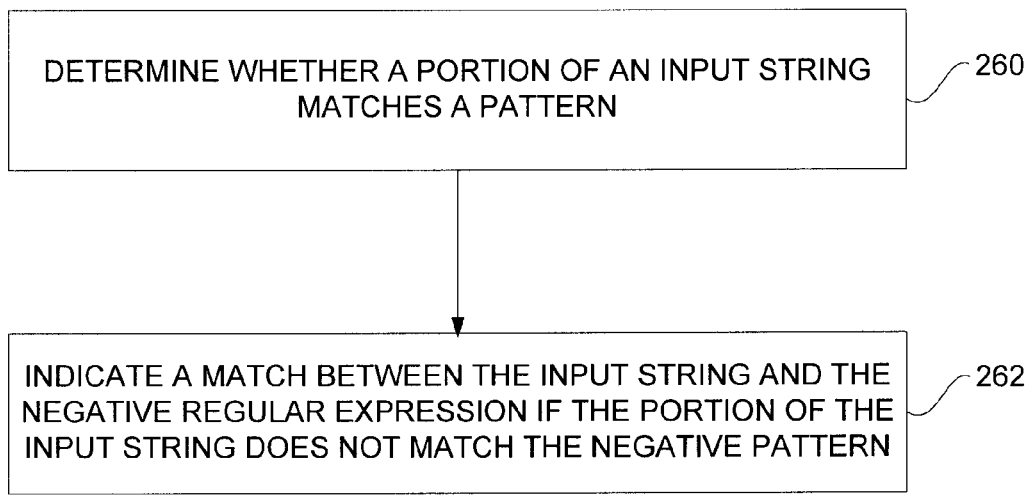
FIG. 2B is an illustrative flowchart depicting a negative regular expression search operation in accordance with other embodiments.

FIG. 2B depicts the functional steps content search system 100 may perform in comparing an input string with the negative regular expression of Example 3. In step 260, content search system 100 determines whether a portion of an input string matches the negative pattern identified by the negative regular expression. In this example, content search system 100 determines whether the first 100 characters of an input string match or do not match the negative pattern "abcd". In step 262, content search system 100 indicates a match between the input string and the negative regular expression of Example 3 if the first 100 characters of the input string do not match the pattern "abcd".

If an input string corresponds to a packet, then the negative regular expression of Example 3 will indicate a match if the first 100 bytes of the packet do not match the string "abcd." Thus, if the string "abcd" appears after the first 100 bytes of the packet in this example, then a match would still be indicated by the negative regular expression of Example 3 because the negative regular expression specifies that the negative pattern must not appear in the first 100 bytes of the packet.

Figure 2C:
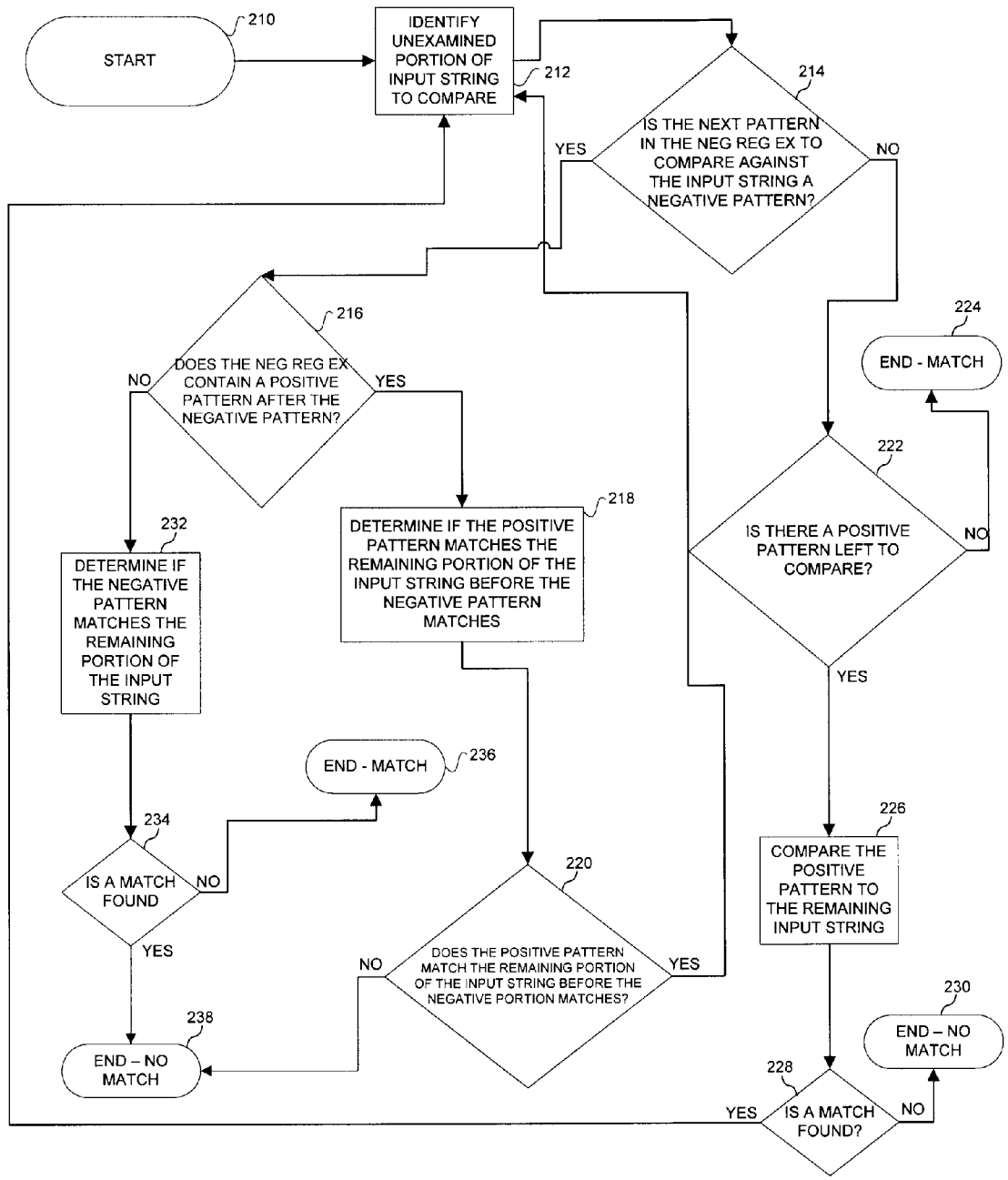
FIG. 2C is a more detailed flowchart depicting an exemplary negative regular expression search operation in accordance with one embodiment.

For some embodiments, content search system 100 of FIG. 1 may compare an input string with a negative regular expression by performing the high-level functional steps illustrated in the flowchart of FIG. 2C, which is described below in the context of comparing an input string to the illustrative negative regular expression "aaaa.*(?^xxx)abcd" given above in Example 2. The steps of FIG. 2C are merely exemplary of how some embodiments may be implemented to compare an input string to a negative regular expression, as other embodiments may compare input strings to negative regular expression using an approach that differs from the particular steps shown in the example of FIG. 2C.

Initially, in step 210, a content search system is tasked with comparing an input string with a negative regular expression. The content search system, as used herein, refers to any mechanism that is capable of comparing one or more input strings with a negative regular expression. For example, a content search system may be implemented using a content addressable memory (CAM) device. As another example, a content search system may be a software application that is capable of searching one or more documents or files the presence or non-presence of certain patterns.

In step 212, the content search system identifies the unexamined portion of the input string left to compare. Naturally, if this is the first time step 212 is being performed by the content search system, then the entire input string needs to be compared, and the content search system would perform step 212 by simply identifying the beginning of the input string. However, if a portion of the input string has previously been compared, then in step 212 the content search system would identify the beginning of the unexamined portion of the input string.

In step 214, a determination is made, by the content search system, as to whether the next pattern in the negative regular expression to compare against the input string is a negative pattern. For example, the first pattern in the negative regular expression "aaaa.*(?^xxx)abcd" is the positive pattern "aaaa". Therefore, because this negative regular expression has yet to be compared to the input string, "aaaa" is the next pattern to be compared in the negative regular expression. Since "aaaa" is a positive pattern (since it is not accompanied by or associated with a negative pattern identifier), then the content search system answers the determination of step 214 in the negative, and processing proceeds to step 222.

In step 222, the content search system determines whether there is a positive pattern left to compare in the negative regular expression, and if so, then the content search system would identify the next positive pattern left to compare in the negative regular expression. As discussed above, in this example, the determination of step 222 would be positive, and the content search system would identify the positive pattern "aaaa" as the next pattern to compare.

If the determination of step 222 is negative, indicating that there are no more patterns in the negative regular expression left to compare with the input string, then processing ends at step 224. Step 224 is a termination step that indicates that the negative regular expression matches the input string.

Because the determination of step 222 is positive in this example, processing proceeds to step 226. In step 226, the content search system compares the identified positive pattern (which in this example is the positive pattern "aaaa") with the input string. In step 228, the content search system determines the result of the comparison of step 226, and if the match is found, then processing proceeds back to step 212 (previously discussed), so that the remaining portion of the input string may be searched to determine if the remaining portion of the input string matches any remaining portion of the negative regular expression. However, if the positive pattern does not match the input string, then processing would terminate in step 230. Step 230 indicates that no match was found between the negative regular expression and the input string because a positive pattern within the negative regular expression did not match the input string.

Returning again to our example, assume that the positive pattern "aaaa" within the negative regular expression "aaaa.*(?^xxx)abcd" was found within the input string, and processing returned to step 212. Upon returning to step 212, the content search system would identify the remaining portion of the input string left to compare against the negative regular expression. In this example, the remaining portion of the input string left to compare would be the remaining portion of the input string after the matching "aaaa" positive pattern. Thereafter, processing would proceed to step 214, where, in this example, the negative pattern "xxx" would be identified as the next pattern, in the negative regular expression, to compare against the input string. As a result, processing would proceed to step 216.

In step 216, the content search system determines whether the negative regular expression contains a positive pattern after the current negative pattern to be compared. This step is advantageous because it allows the content search system (in step 218) to simultaneously search for a negative pattern and for a positive pattern, thereby making the comparison of the input string with the negative regular expression more efficient. In the present example, the determination of step 216 is positive, since the negative regular expression "aaaa.*(?^xxx) abcd" contains the positive pattern "abcd" after the negative pattern "xxxx". As a result, processing would proceed to step 218 in this example.

In step 218, the content search system compares the remaining portion of the input string to determine if the remaining portion of the input string matches the negative pattern or the positive pattern. Advantageously, in performing step 218, the content search system can determine if the negative pattern matches the input string while determining if the positive pattern matches the input string.

In step 220, the content search system determines whether the positive pattern matches the remaining portion of the input string before the negative pattern matches the remaining portion of the input string. If the positive pattern matches the remaining portion of the input string before the negative pattern, then processing returns to step 212, as depicted in FIG. 2C, so that any remaining patterns in the negative regular expression may be checked. However, if the negative pattern matches the remaining portion of the input string before the positive pattern, then that means the negative pattern was found in the input string. Since the negative pattern matched the input string, the input string does not match the negative regular expression, as indicted by the termination step 238.

As depicted in FIG. 2C, if the determination of step 216 is negative, then processing proceeds to step 232. In step 232, the content search system compares the negative pattern being to the remaining portion of the input string. In step 234, the content search system determines if the negative pattern matched the remaining portion of the input string. If the negative pattern did not match the remaining portion of the input string, then the input string matches the negative regular expression, as indicated by termination step 236 of FIG. 2C. On the other hand, if the negative pattern matches the remaining portion of the input string, then the input string does not match the negative regular expression, as indicated by termination step 238 of FIG. 2C.

As illustrated by the above description, by performing the high-level functional steps shown in FIG. 2C, content search system 100 of FIG. 1 may compare an input string with a negative regular expression in a single pass of the input string. By comparing an input string with a negative regular expression in a single pass of the input string, content search system 100 performs faster comparisons using fewer resources than other content search systems that use a multi-pass approach.

Figure 3:
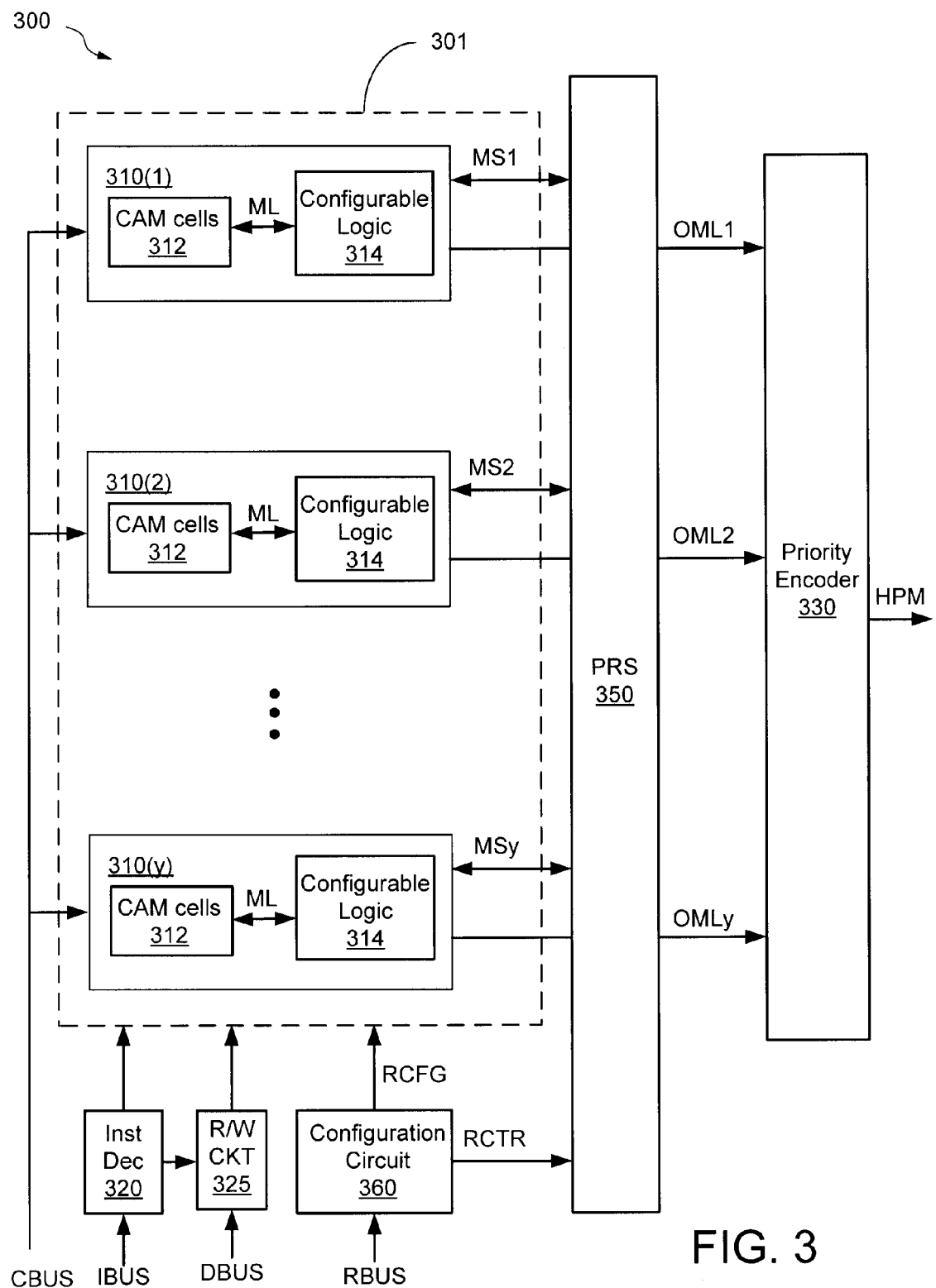
FIG. 3 shows a simplified block diagram of a content addressable memory (CAM) device having a programmable interconnect structure (PRS) connected to CAM rows in accordance with some embodiments.

FIG. 3 is a functional block diagram of a CAM device 300 within which some of the present embodiments may be implemented to perform negative regular expression search operations. CAM device 300 includes a CAM array 301, an instruction decoder 320, a read/write circuit 325, a priority encoder 330, a programmable interconnect structure (PRS)

350, and a configuration circuit 360. Other well-known components and control signals, for example, such as an address decoder, comparand register, and clock signals, are not shown for simplicity. CAM array 301 includes a plurality of rows 310(1)-310(y), each having a number of CAM cells 312 and a configurable logic circuit 314. Each CAM row 310 is coupled to a comparand bus CBUS via a well-known comparand register (not shown for simplicity), and is coupled to the PRS 350 via match signal (MS) lines and to the priority encoder 330 via output match lines (OML). CAM cells 312 can be any suitable type of CAM cells including, for example, binary CAM cells, ternary CAM cells, and/or quaternary CAM cells. For each CAM row 310, the CAM cells 312 are coupled to the configurable logic circuit 314 via match lines, which can provide match signals from CAM cells 312 to configurable logic circuit 314, and for some embodiments can also provide match signals from configurable logic circuit 314 as enable signals to CAM cells 312. The configurable logic circuits 314 can be programmed or configured using row configuration data (RCFG) to selectively route match signals to priority encoder 330 via the output match lines (OML), to route the match signals to the PRS 350 via the MS lines, and/or to selectively combine the row match signals with match signals from one or more other CAM rows provided on the MS lines by the PRS 350.

Priority encoder 330, which is well-known, has inputs coupled to the output match lines (OML) from the CAM rows 310, and has an output to generate the index of the highest priority matching CAM row 310 (e.g., the HPM index). Although not shown for simplicity, each row of CAM cells 312 can include a validity bit (V-bit) that indicates whether valid data is stored in the CAM row, and the V-bits can be provided to the priority encoder 330 to determine the next free address in the CAM array for storing new data.

Instruction decoder 320 decodes instructions provided on the instruction bus IBUS, and provides control signals to CAM cells 312 and to read/write circuit 325 that control read, write, and compare operations in CAM array 301. For other embodiments, instruction decoder 320 can decode the instructions and provide configuration information to configurable logic circuits 314.

Read/write circuit 325, which is well-known, controls read and write operations for CAM array 301. For example, during write operations, data is provided to read/write circuit 325 via a data bus (DBUS), or alternately from CBUS, and in response to control signals provided by instruction decoder 320, read/write circuit 325 writes the data into the CAM cells 312 of the row or rows selected for the write operation. During read operations, data is output in a well-known manner from one or more selected CAM rows 310 to read/write circuit 325, which in turn provides the data onto DBUS.

The PRS 350 includes a plurality of signal routing lines (not shown individually in FIG. 3 for simplicity) extending across the rows 310 of CAM cells 312 and programmably connected to the match signal (MS) lines in each CAM row 310 in response to routing control signals (RCTR). As explained in more detail below, the RCTR signals control the configuration of a plurality of programmable switch matrixes (not shown in FIG. 3 for simplicity) that selectively connect the MS lines of the various CAM rows 310 to the signal routing lines within the PRS 350. The PRS 350 can be implemented using any suitable circuits and/or logic (e.g., switch matrixes, crossbar circuits, programmable switches, and so on) that selectively routes the row match signals from each CAM row to any number of arbitrarily selected CAM rows (e.g., regardless of whether the selected CAM rows are adjacent to one another) at the same time.

Configuration circuit 360 includes an input coupled to a regular expression bus (RBUS), first outputs coupled to CAM array 301, and second outputs coupled to the PRS 350. For some embodiments, configuration information (e.g., which can embody one or more regular expressions) can be provided to configuration circuit 360 via RBUS, and in response thereto configuration circuit 360 provides the row configuration information (RCFG) to configurable logic circuits 314 and provides the routing control signals (RCTR) to the PRS 350. For one embodiment, configuration circuit 360 includes a configuration memory (not shown for simplicity in FIG. 3) for storing RCFG and RCTR information received from RBUS. Together, the RCFG and RCTR information form configuration data that can be used to program the CAM device 100 to implement search operations for one or more regular expressions, as described below.

For other embodiments, RCFG can be provided to row configurable logic circuits 314 using other techniques. For example, for another embodiment, RCFG can be provided to configurable logic circuits 314 using the instruction decoder 320 and/or stored in memory elements (not shown for simplicity) within the CAM rows 310. Similarly, for other embodiments, the RCTR signals can be provided to the PRS 350 using other techniques. For example, for another embodiment, the RCTR signals can be provided to the PRS using the instruction decoder 320 and/or stored in memory elements (not shown for simplicity) within the PRS 350.

In accordance with present embodiments, the PRS 350 can be selectively configured to route the match signals from any CAM row 310 as an input match signal to any number of other arbitrarily selected or located CAM rows 310 at the same time, regardless of whether the other selected CAM rows are contiguous with one another. Further, for some embodiments, the PRS 350 can be configured to route match signals from one CAM row as the input match signal to the same row. The input match signals can be used as row enable or trigger signals to selectively enable the CAM rows for subsequent compare operations, and can therefore be used to logically connect a number of arbitrarily selected CAM rows together. As described below, CAM devices employing CAM arrays configured in accordance with present embodiments provide numerous functional and performance advantages over conventional CAM devices.

First, because the PRS 350 can route the match signals from any CAM row 310 in CAM array 301 to any number of arbitrarily selected CAM rows 310 in the array 301, a data word chain spanning a multiple number N of CAM rows can be stored in any available N CAM rows 310 of CAM array 301, even if none of the available CAM rows are contiguous or adjacent to each other, by configuring the PRS 350 to logically connect the available CAM rows together to form a data word chain. Thus, for example, if CAM array 301 of FIG. 3 includes 5 available but non-contiguous CAM rows 310, then the PRS 350 can be programmed to logically connect the 5 available CAM rows 310 into a chain that can store a data word chain spanning 5 CAM rows. In contrast, to store a new 5 data word chain in a prior CAM device such as disclosed in U.S. Pat. No. 6,252,789, a block of 5 available and contiguous CAM rows are needed. Thus, if there are 5 available but non-contiguous CAM rows in the CAM device of the '789 patent, the new 5 data word chain can be stored therein only if the existing contents of the CAM array are re-arranged to create a block of 5 available contiguous CAM rows, which undesirably requires burdensome and time-consuming table management tools.

Second, by allowing match signals from one CAM row to be routed to any number of selected CAM rows (e.g., including the same CAM row) as input match signals at the same time, embodiments of the present invention can store many regular expressions using significantly fewer numbers of CAM rows than conventional CAM devices. More specifically, because the PRS 350 can simultaneously and independently route the match signals from any CAM row 310 to any number of other CAM rows 310 at the same time, embodiments of CAM device 100 can store a regular expression in its rolled format (e.g., its original form), for example, because each common portion of all the different strings that can match the regular expression can be stored in a corresponding single location (e.g., in one CAM row or one group of CAM rows), and their match signals can be simultaneously routed to multiple other locations that store other non-common portions of the possible matching strings. In contrast, storing a regular expression in CAM devices such as those disclosed in U.S. Pat. No. 6,252,789 requires unrolling the regular expression to generate all possible matching strings of the regular expression, and then storing each of the possible matching strings in a corresponding group of contiguous CAM rows.

Further, the ability of the PRS 350 to selectively route the match signal from each CAM row 310 in CAM array 301 to itself and/or to any number of other arbitrarily selected CAM rows 310 at the same time allows embodiments of CAM device 100 to implement search operations for regular expressions that include quantifiers such as the Kleene star "*." The Kleene star denotes zero or more instances of the preceding character in the regular expression. For example, to match the regular expression REG3="abc*de," an input string must include zero or more instances of the character "c" appearing between the prefix string "ab" and the suffix string "de." Thus, while the input strings "abde," abcde," and "abccde" all match REG3="abc*de," an input string including thousands, millions, or even an infinite number of instances of "c" between the prefix "ab" and the suffix "de" will also match REG3c="abc*de."

Regular expressions that include the Kleene star "*" can be efficiently stored in embodiments of CAM device 100 by configuring the PRS 350 to form a match signal loop for the Kleene character and to route the match signals of the prefix string and the Kleene character as an enable or trigger signal for matching the suffix string, for example, as described in detail in commonly-owned U.S. Pat. No. 7,643,353.

In contrast, conventional CAM devices (e.g., such as those disclosed in U.S. Pat. No. 6,252,789) cannot implement search operations for regular expressions that include the Kleene star "*" because of the infinite number of different input patterns that can generate a match condition. As discussed above, to store a regular expression in the '789 CAM device, the regular expression is unrolled to generate all possible matching strings, which are then stored in corresponding groups of rows in the CAM device. Thus, to store and implement search operations for REG3="abc*de" in the '789 CAM device, every pattern that includes zero or more instances of "c" between the prefix "ab" and the suffix "de" must be stored therein, which is impossible because there are an infinite number of different input strings that can match REG3="abc*de."

Figure 4:
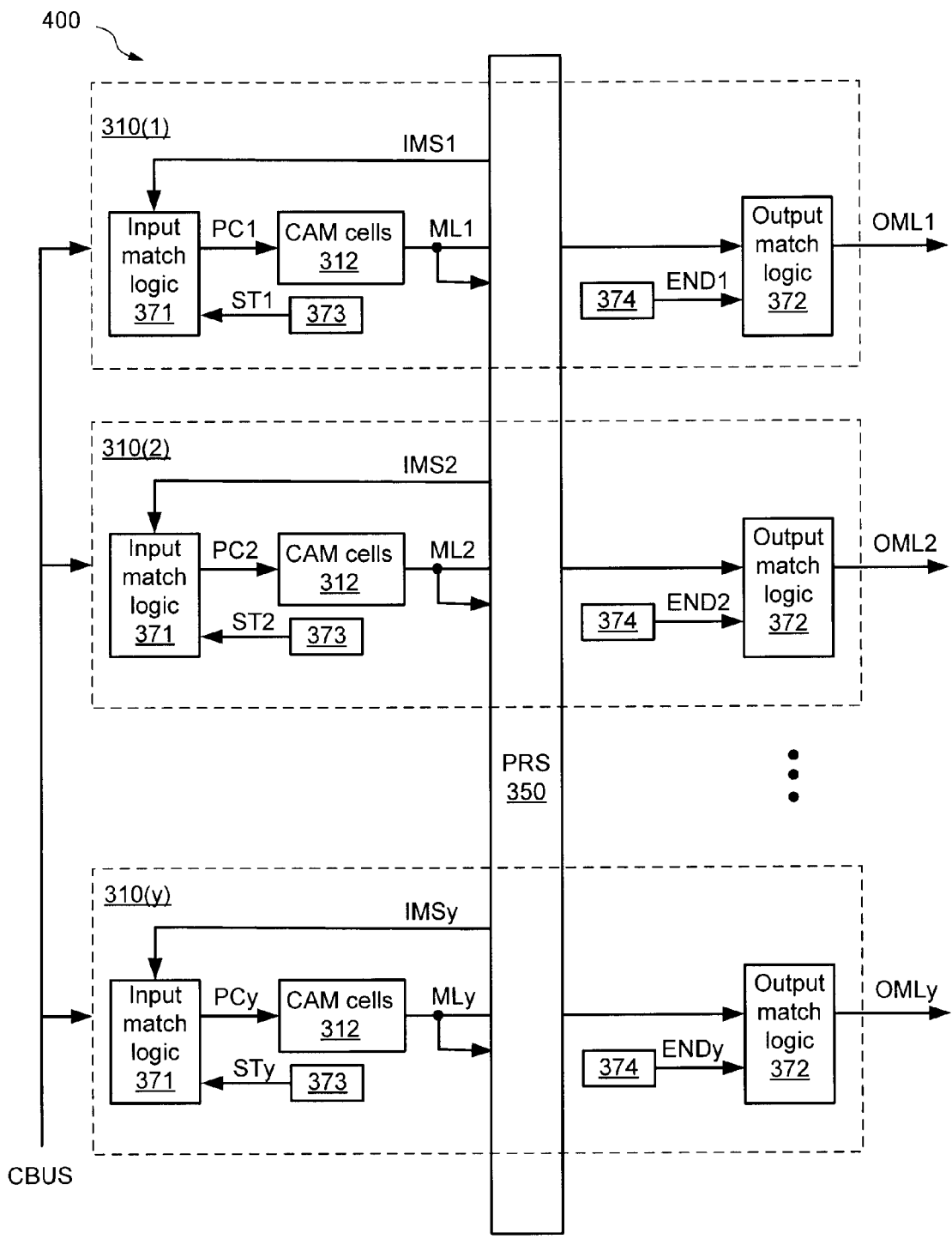
FIG. 4 shows a simplified block diagram of one embodiment of the CAM array of FIG. 3.

FIG. 4 shows a CAM array 400 that is one embodiment of CAM array 301 of FIG. 3. For the exemplary embodiment of FIG. 4, each CAM row 310 includes a number of CAM cells 312, input match logic 371, output match logic 372, and configuration memory cells 373-374. Each CAM row is selectively connected to the PRS 350, which as described above can route match signals from any CAM row to one or more arbitrarily selected CAM rows at the same time. Within each CAM row 310, the input match logic 371 includes a data input to receive match signals from the same or a number of other CAM rows 310 via the input match signal (IMS) lines, a control input to receive a start bit (ST) from configuration memory cell 373, and an output to provide a pre-charge signal PC to the CAM cells 312. Output match logic 372 includes a data input to receive match signals from the CAM cells 312 via the match lines ML during compare operations with input data, a control input to receive an end bit (END) from configuration memory cell 374, and an output coupled to priority encoder 330 via the output match line OML. Together, input match logic 371 and output match logic 372 form one embodiment of the configurable logic circuit 314 of FIG. 3.

The configuration memory cells 373-374 can be any suitable type of memory cells including, for example, an SRAM or DRAM cells, EEPROM cells, flash memory cells, fuses, and so on. Further, although depicted in FIG. 4 as being separate memory elements associated with corresponding CAM rows 310, for other embodiments, the memory cells 373-374 can be formed as an addressable array of configuration memory cells.

The start (ST) and end (END) bits for each row 310 in FIG. 4, which together represent the row configuration information (RCFG) for a corresponding CAM row of FIG. 3, control the logical operations and routing functions of the input match logic 371 and the output match logic 372, respectively, of the CAM row during compare operations. More specifically, the start bit (ST) indicates whether the data word stored in the corresponding CAM row is the first data word of a data word chain, and the end bit (END) indicates whether the data word stored in the corresponding CAM row is the last data word of a data word chain. The start bit and end bit can be further encoded, as shown below in Table 1, to indicate that the corresponding data word is a continuing data word or a default data word, where a continuing data word is an intermediate data word between the first and last data words in a data word chain that spans multiple CAM rows, and a default data word corresponds to a data word chain that has only one data word (and thus spans only one CAM row 310).

TABLE 1

| ST | END | Function |
| --- | --- | --- |
| 0 | 0 | continuing word |
| 0 | 1 | last word |
| 1 | 0 | first word |
| 1 | 1 | default word |

For some embodiments of CAM array 400 of FIG. 4, if the start bit ST of a row 310 is asserted, which indicates that the CAM row 310 stores the first data word in a chain, the asserted state of ST causes input match logic 371 to ignore any input match signals (e.g., received from the PRS 350 via the IMS line) and allows the match signal generated in response to a comparison between input data (e.g., an input character of the input string) and the data stored in the row's CAM cells 312 to be propagated as the output match signal for the row on the match line ML. Conversely, if ST of the row 310 is de-asserted, which indicates that the CAM row stores either an intermediate word or the last word in the data word chain, the de-asserted state of ST causes the row's input match circuit 371 to selectively enable compare operations between the input character and data stored in the row's CAM cells 312 in response to the input match signals received from the same and/or one or more other arbitrarily selected CAM rows (e.g. received from the PRS 350) to generate an output signal for the CAM row. In either case, the match signal on the row's match line is provided to both the PRS 350 and to the row's output match logic 372.

Further, if the end bit END of the CAM row 310 is asserted, which indicates that CAM row 310 stores the last data word in the chain, the asserted state of END causes the row's output match logic 372 to pass the row's match signal on its match line ML to the priority encoder 330 via its OML line. Conversely, if END for the CAM row 310 is de-asserted, which indicates that CAM row 310 does not store the last data word in the data word chain, the de-asserted state of END prevents the row's output match logic 372 from passing the row's match signal on ML to the priority encoder 330. The logic functions and output results provided by the CAM rows of FIG. 4 are summarized below in Table 2, where CMP indicates the results of a compare operation between an input character and data stored in the CAM cells 312 of the CAM row 310 and "*" indicates the logical AND function.

TABLE 2

| ST | END | ML | OML |
|----|-----|----|----|
| 0 | 0 | IMS * CMP | 0 |
| 0 | 1 | IMS * CMP | IMS * CMP |
| 1 | 0 | CMP | 0 |
| 1 | 1 | CMP | CMP |

Thus, as described above, during search operations, input match logic 371 selectively enables CAM cells 312 for compare operations in response to ST and the input match signals provided on the IMS lines, and output match logic 372 selectively provides the row match signals from CAM cells 312 on ML to the priority encoder 330 via OML in response to END. As explained in more detail below, by selectively enabling the CAM row 310 in response to the IMS signals during compare operations, input match logic 371 can not only combine match signals from multiple CAM rows but can also minimize power consumption by pre-charging the match lines ML of only those CAM rows 310 that need to participate in a given compare operation while disabling all other CAM rows (e.g., that do not need to participate in the given compare operation.

Figure 5:
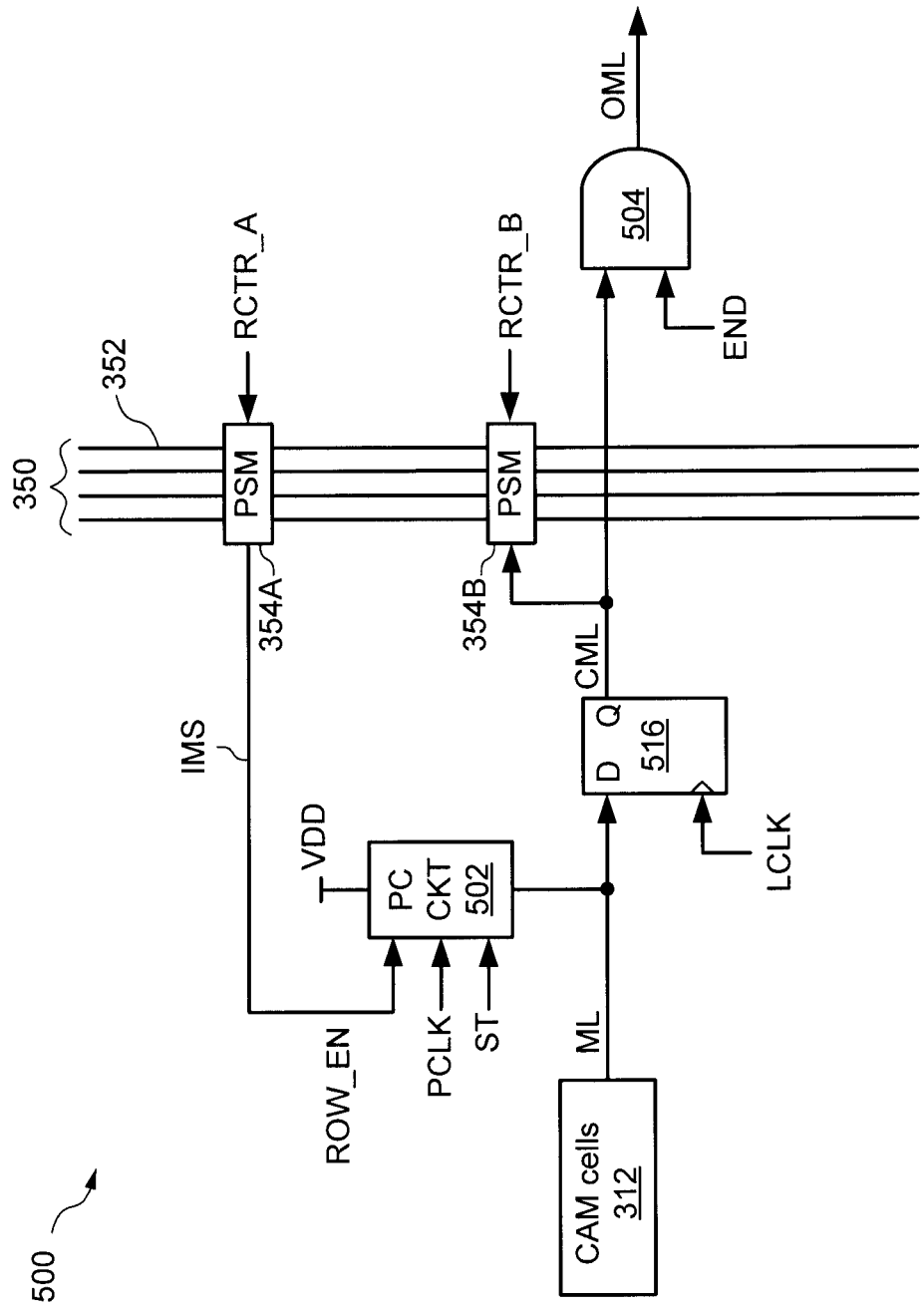
FIG. 5 shows a block diagram of one embodiment of the CAM rows of the CAM array of FIG. 4.

FIG. 5 shows a CAM row 500 that is one embodiment of CAM row 310 of CAM array 301 of FIG. 3. CAM row 500, which includes a number of CAM cells 312, a match signal latch 516, a match line pre-charge circuit (PC CKT) 502, and an AND gate 504, is selectively connected to PRS 350 via programmable switch matrixes (PSM) 354A-354B. CAM cells 312, which can be any suitable CAM cell for storing a data word and comparing the data word with a search key, can include binary CAM cells, ternary CAM cells, and/or quaternary CAM cells. CAM cells 312 receive a search key or comparand word from the comparand bus CBUS (not shown for simplicity in FIG. 3A), and are coupled to match line ML.

Latch 516 includes a data input (D) coupled to ML, a clock input "<" to receive a latch clock signal (LCLK), and an output (Q) to provide clocked match signals on the clocked match line (CML) in response to LCLK. Latch 516, which can be any suitable latch or register circuit, latches the current match signals from CAM cells 312 onto CML. Although not shown for simplicity in FIG. 5, latch 516 also includes a terminal coupled to ground potential (VSS). The CML line is coupled to AND gate 504, and is also selectively connected to the signal routing lines 352 of PRS 350 via PSM 354B. AND gate 504 also includes a second input to receive the END bit for the row, and includes an output to provide the row output match signals to priority encoder 330 via the OML line. Thus, AND gate 504, which selectively forwards the match signal on CML to priority encoder 330 in response to END, is one embodiment of output match logic 372 of FIG. 4. Accordingly, if END is asserted (e.g., to logic high), AND gate 504 forwards to the match signals on CML to the priority encoder 330 via OML. Conversely, if END is de-asserted (e.g., to logic low), then AND gate 504 does not forward the match signals on CML to the priority encoder 330.

Match line pre-charge circuit 502 has a first power terminal coupled to VDD, a second power terminal coupled to ML, a first input to receive ST for the row, a second input to receive a pre-charge clock signal PCLK, and a third input to selectively receive match signals from another CAM row via PRS 350 on the IMS line as a row enable signal (ROW_EN). Match line pre-charge circuit 502, which is one embodiment of input match logic 371 of FIG. 4, can be any suitable circuit that selectively pre-charges ML upon assertion of PCLK in response to ROW_EN and ST, as explained in more detail below. Together, match line pre-charge circuit 502 and AND gate 504 of CAM row 500 form another embodiment of configurable logic circuit 314 of FIG. 3.

PRS 350 is shown in FIG. 5 to include four signal routing lines 352 that can be selectively connected to the row's IMS lines via PSM 354A and/or to the row's CML line via PSM 354B. PSM 354A includes a control terminal to receive RCTR_A, which controls which signal routing lines 352 of the PRS 350 are connected to which (if any) IMS lines of row 500. PSM 354B includes a control terminal to receive RCTR_B, which controls which signal routing lines 352 are connected to the CML line of row 500. Thus, the routing control signals RCTR_A and RCTR_B, which can be stored in the configuration circuit 360 (see also FIG. 3) or provided by the instruction decoder 320, control which match signals from other CAM rows are selected as IMS (e.g., as row enable signals) to ML pre-charge circuit 502 of CAM row 500, and also control whether row match signals generated on CML are provided to the PRS 350 for use as IMS signals by the same and/or one or more other arbitrarily selected CAM rows. In this manner, PRS 350 provides a programmable interconnect structure that can be dynamically configured to route match signals from any CAM row to itself and/or to one or more other arbitrarily selected CAM rows at the same time and independently of each other.

A general operation of the pre-charge circuit 502 is as follows. If ST is asserted to logic high, which indicates that row 500 of CAM cells 312 stores a first word in a data word chain, pre-charge circuit 502 turns on and, upon assertion of PCLK, pulls ML high toward VDD, thereby pre-charging ML and enabling the CAM row 500 for comparison operations, irrespective of the state of the row enable signal (ROW_EN) on the IMS line. Once ML is pre-charged, the data stored in CAM cells 312 of row 500 can be compared with input data (e.g., a search key), and the match signals are provided on ML.

If ST is de-asserted to logic low, which indicates that row 500 of CAM cells 312 stores either an intermediate word or the last word in a data word chain, then the logic state of ROW_EN on the IMS line controls the match line pre-charge operation. More specifically, if the state of ROW_EN on the IMS line received from the PRS 350 is asserted to indicate a match condition in another selected CAM row (e.g., that stores a previous word in the data word chain), the pre-charge circuit 502 turns on and pulls the match line ML high toward VDD, thereby pre-charging ML and enabling the CAM row 500 for comparison operations. Conversely, if the state of ROW_EN on the IMS line received from the PRS 350 is de-asserted to indicate a mismatch condition in the other CAM row, then pre-charge circuit 502 does not pre-charge the match line ML of the row 500, thereby disabling the CAM row 500 for the compare operation and causing a mismatch condition on the CAM row's match line ML.

Note that the CAM arrays described above with respect to FIGS. 3-5 can also include one or more embedded configurable counter circuits that can be programmed to count the number of sequential input characters associated with a quantified character or character class specified in a regular expression, for example, as described in commonly-owned U.S. Pat. No. 7,643,353.

Figure 6:
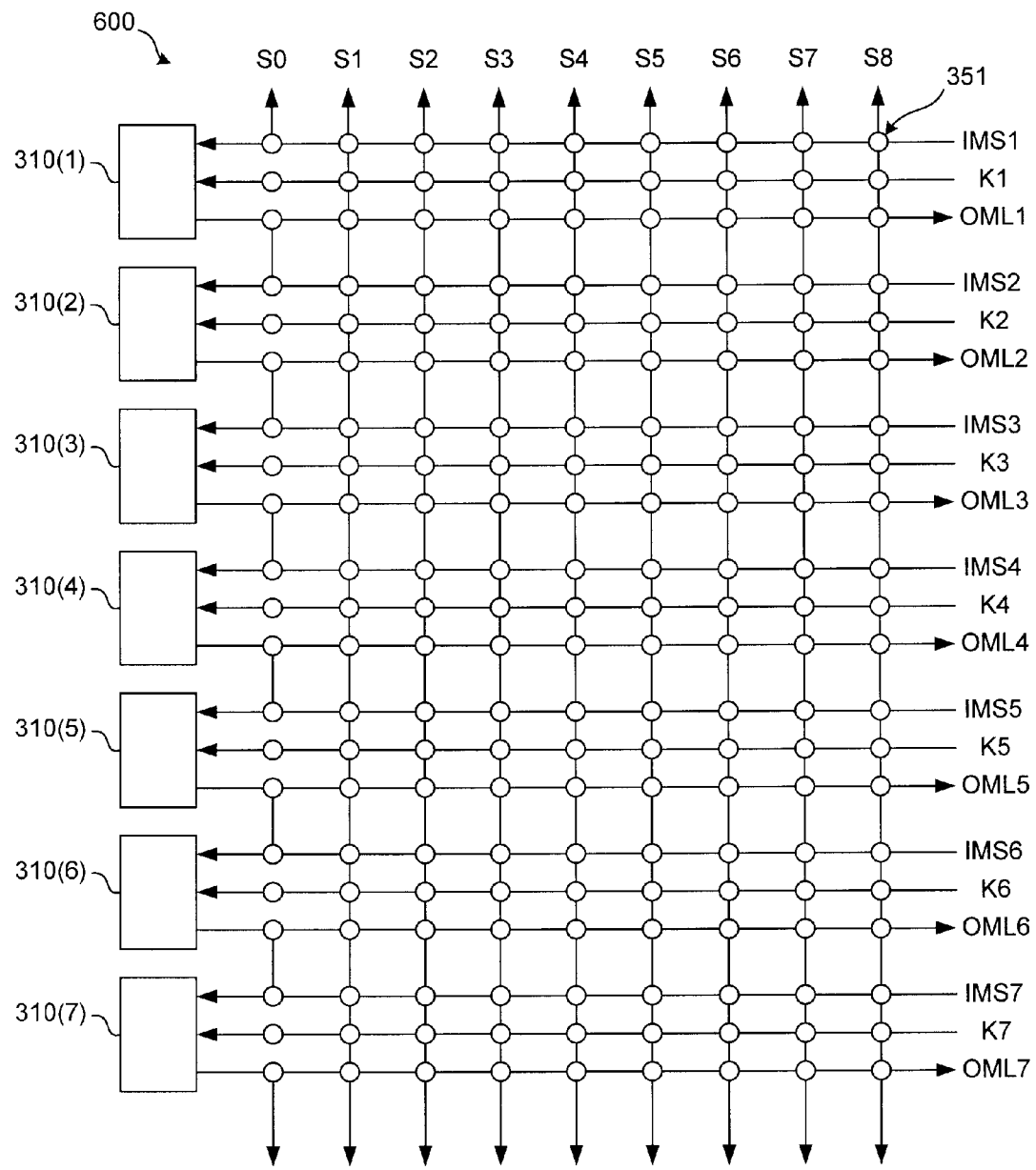
FIG. 6 shows a simplified functional block diagram of one embodiment of the CAM array of FIG. 4.

FIG. 6 shows a functional block diagram of an exemplary CAM array 600 that is one embodiment of the CAM array 400 of FIG. 4. CAM array 600 is shown to include a seven CAM rows 310(1)-310(7) coupled to PRS 350, which is shown in FIG. 6 as including a plurality of state signal lines S0-S8 selectively coupled to the OML and IMS lines of the CAM rows by configurable switches 351. In addition, each row 310 of CAM array 600 is selectively coupled to the PRS 350 by a corresponding "killer" line (K) that, when asserted, disables the CAM row for the next compare operation. For other embodiments, CAM array 600 can include any suitable number of rows 310, and PRS 350 can include any suitable number of state signal lines. Each switch 351, which can be any suitable type of switching element (e.g., a pass transistor, a pass gate, a fuse, and so on), selectively connects a corresponding row signal line (e.g., either the OML, the IMS, or the killer line) and a corresponding state signal line together in response to a routing configuration bit (not shown for simplicity). The routing configuration bits for all of the switches 351 within the PRS of FIG. 6 form one embodiment of the routing configuration data (RCFG) of FIG. 3.

Figure 7:
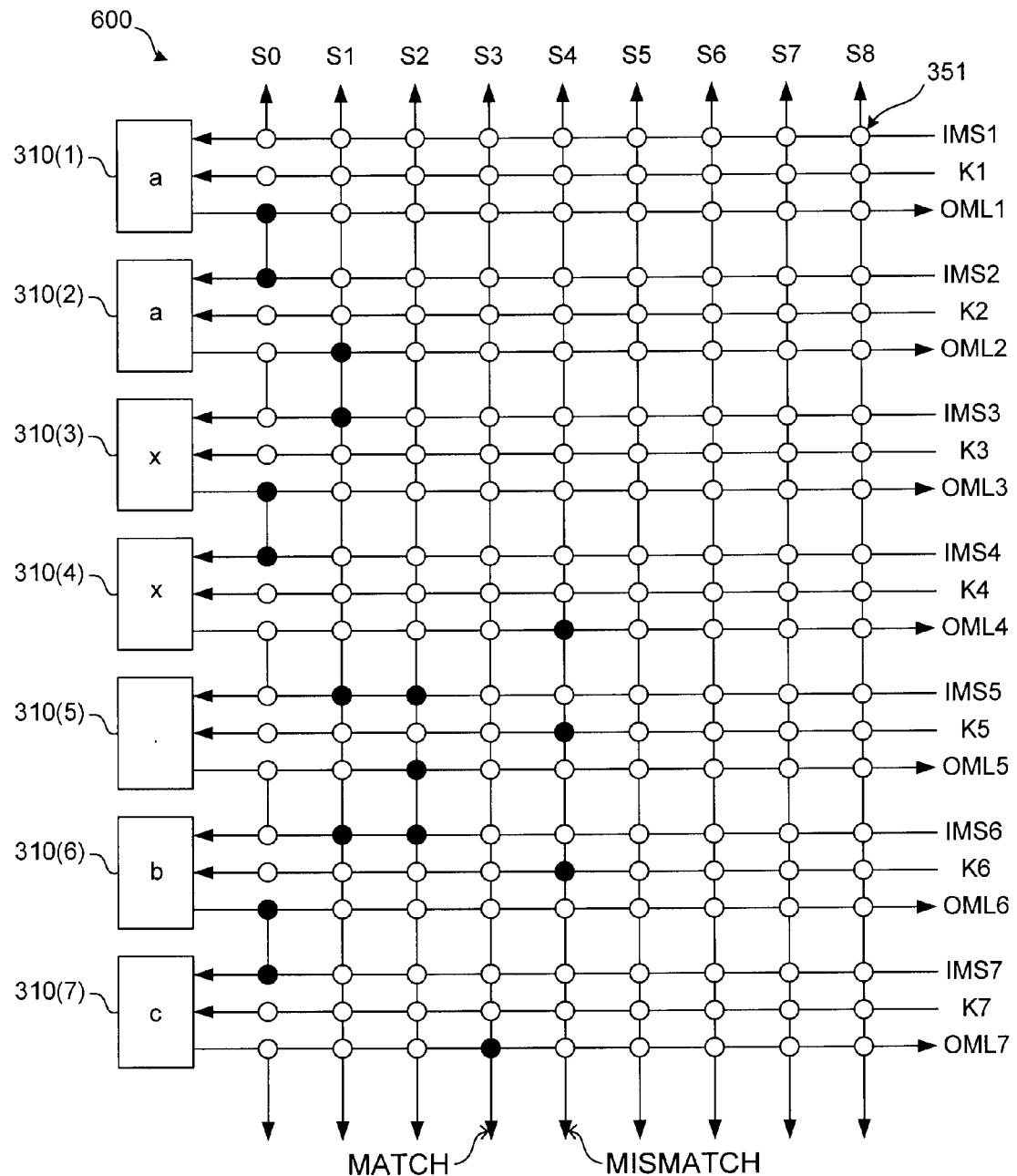
FIG. 7 shows a simplified block diagram of one embodiment of the CAM array of FIG. 6 configured to implement search operations for the negative regular expression "aa.* (?^xx)bc".

FIG. 7 shows depicts an exemplary embodiment of CAM array 600 configured to implement search operations for the negative regular expression of Example 4

Example 4 aa.*(?^xx)bc

The negative regular expression of Example 4 will match any input string that (a) contains the first positive string "aa" followed by the second positive string "bc" and (b) does not contain the negative pattern "xx" after the first positive string 'aa'. For the negative regular expression of Example 4, the characters "aa" are stored in CAM rows 310(1)-310(2), respectively, the characters "xx" are stored in CAM rows 310(3)-310(4), respectively, the wildcard indicator "." is stored in CAM row 310(5), and the characters "bc" are stored in CAM rows 310(6)-310(7), respectively. The OML of CAM row 310(1) is connected to the IMS line of CAM row 310(2) to form the string "aa" by enabling CAM row 310(2) for a compare operation only if there is a match in CAM row 310(1) in a previous compare operation. The OML of CAM row 310(3) is connected to the IMS line of CAM row 310(4) to form the string "xx" by enabling CAM row 310(4) for a compare operation only if there is a match in CAM row 310(3) in a previous compare operation. The OML of CAM row 310(6) is connected to the IMS line of CAM row 310(7) to form the string "bc" by enabling CAM row 310(7) for a compare operation only if there is a match in CAM row 310(6) in a previous compare operation.

Further, the OML of CAM row 310(2) is connected to the IMS lines of CAM rows 310(3), 310(5), and 310(6) so that upon detecting a match with the first positive pattern "aa", CAM rows 310(3), 310(5), and 310(6) are simultaneously enabled for the next compare operation. In this manner, once a match with the first positive pattern is detected, CAM array 600 can begin looking for matches with the negative pattern "xx", the wildcard indicator ".", and the second positive pattern "bc" by enabling respective CAM rows 310(3), 310(5), and 310(6). The OML of CAM row 310(5) is connected to the IMS lines of CAM rows 310(5) and 310(6) so that detection of the wildcard character in any compare operation enables the CAM array to detect another "." or the "b" of the second positive pattern "bc" in the next compare operation. The OML of CAM row 310(7) is connected to the PRS state line S3 so that a match with the second positive pattern "bc" results in a match condition with the negative regular expression "aa.*(?^xx)bc".

In accordance with present embodiments, the OML of CAM row 310(4) is connected to the killer lines K5 and K6 of respective CAM rows 310(5) and 310(6) so that upon detecting a match with the negative pattern "xx", CAM rows 310(5) and 310(6) are disabled for the next compare operation, and the mismatch condition is indicated on the PRS state line S4. In this manner, if the negative pattern "xx" is found in the input string, the CAM array 600 indicates a mismatch condition with the negative regular expression "aa.*(?^xx)bc".

Thus, during search operations in the CAM array 600 of FIG. 7 to determine whether an input string matches the negative regular expression "aa.*(?^xx)bc", once the first positive pattern "aa" is found in the input string, the CAM array 600 of FIG. 7 simultaneously attempts to find "xx" and "bc" in the input string. If the second positive pattern "bc" is found before the negative pattern "xx" is found, then state line S3 is asserted and a match condition is indicated. However, if the negative pattern "xx" is found before the second positive pattern "bc" is found, CAM row 310(4) asserts its output line OML4, which in turn asserts the state line S4 to indicate the mismatch condition and also asserts killer lines K5 and K6. Assertion of the killer line K5 disables (or "kills") the "." character associated with CAM row 310(5) and the "b" character associated with CAM row 310(6) from further comparison. Note that the killer signal provided on state line S4 has a higher priority than other state signals, and therefore if killer track S4 is asserted, then killer track S4 disables (or "kills") all CAM rows connected thereto, irrespective of other input signals provided to those CAM rows.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a content search system for determining whether an input string of characters matches a negative regular expression that includes a positive pattern and a negative pattern, comprising:

comparing the input string with the positive pattern and the negative pattern in a single pass of the input string, wherein the comparing is performed in a content addressable memory (CAM) device, that contains a plurality of CAM rows that store a data word chain, wherein the data word chain corresponds to the negative regular expression and spans multiple non-contiguous CAM rows; and indicating a match between the input string and the negative regular expression if the input string (a) matches the positive pattern and (b) does not match the negative pattern.

2. The method of claim 1, wherein the negative pattern is associated with an identifier that distinguishes the negative pattern from the positive pattern.

3. The method of claim 2, wherein the negative identifier is the symbol combination ?^.

4. The method of claim 1, wherein the negative pattern is associated with an identifier that indicates the negative pattern should not be present within the input string for the input string to match the negative regular expression, and the identifier is the symbol combination ?^.

5. The method of claim 1, wherein the positive pattern is a first positive pattern, wherein the negative regular expression further includes a second positive pattern, and wherein the negative pattern is positioned between the first and second positive patterns within the negative regular expression.

6. The method of claim 5, wherein the input string is compared with the negative pattern and with the second positive pattern at the same time.

7. The method of claim 1, wherein the comparing further comprises:
after determining that the input string matches the positive pattern, determining whether a remaining portion of the input string matches the negative pattern.

8. A method performed by a content search system for determining whether an input string of characters matches a negative regular expression that includes a positive pattern and a negative pattern, comprising:
comparing, in a content addressable memory (CAM) device, a first portion of the input string with the positive pattern to generate a match signal, wherein the CAM device contains a plurality of CAM rows that store a data word chain, and wherein the data word, chain corresponds to the negative regular expression and spans multiple non-contiguous CAM, rows;
comparing, in the CAM device, a second portion of the input string with the negative pattern to generate a mismatch signal; and
indicating a match condition between the input string and the negative regular expression if the match signal indicates a match between the first portion and the positive pattern and if the mismatch signal indicates a mismatch between the second portion and the negative pattern.

9. The method of claim 8, further comprising:
enabling comparison between the second portion and the negative pattern only if the match signal indicates a match condition between the first portion and the positive pattern.

10. The method of claim 8, wherein the negative pattern is associated with an identifier that distinguishes the negative pattern from the positive pattern.

11. The method of claim 10, wherein the identifier is the symbol combination ?^.

12. A content search system for determining whether an input string of characters matches a negative regular expression that includes a positive pattern and a negative pattern, comprising:
means for comparing the input string with the positive pattern and the negative pattern in a single pass of the input string, wherein the means for comparing comprises a content addressable memory (CAM) device, that contains a plurality of CAM rows that store a data word chain, wherein the data, word chain corresponds to the negative rear expression and spans multiple non-contiguous CAM rows; and
means for indicating a match between the input string and the negative regular expression if the input string (a) matches the positive pattern and (b) does not match the negative pattern.

13. The content search system of claim 12, wherein the positive pattern is a first positive pattern, wherein the negative regular expression further includes a second positive pattern and the negative pattern is positioned between the first and second positive patterns within the negative regular expression, and wherein the input string is compared with the negative pattern and the second positive pattern at the same time.

14. The content search system of claim 12, wherein the negative pattern is associated with an identifier that distinguishes the negative pattern from the positive pattern.

15. The content search system of claim 14, wherein the identifier is the symbol combination ?^.

16. The content search system of claim 12, wherein the negative pattern is associated with an identifier that indicates the negative pattern should not be present within the input string for the input string to match the negative regular expression, and the identifier is the symbol combination ?^.

17. The content search system of claim 12, wherein the positive pattern is a first positive pattern, wherein the negative regular expression further includes a second positive pattern, and wherein the negative pattern is positioned between the first and second positive patterns within the negative regular expression.

18. The content search system of claim 17, wherein the input string is compared with the negative pattern and with the second positive pattern at the same time.

19. The content search system of claim 18, wherein the means for comparing further comprises:
means for determining whether a remaining portion of the input string matches the negative pattern after determining that the input string matches the positive pattern.

20. The content search system of claim 12, wherein the means for comparing and the means for indicating are implemented entirely in hardware.

21. A content search system for determining whether an input string of characters matches a negative regular expression that includes a positive pattern and a negative pattern, comprising:
means for comparing a first portion of the input string with the positive pattern to generate a match signal;
means for comparing a second portion of the input string with the negative pattern to generate a mismatch signal; and
means for indicating a match condition between the input string and the negative regular expression if the match signal indicates a match between the first portion and the positive pattern and if the mismatch signal indicates a mismatch between the second portion and the negative pattern, wherein the means for comparing the first portion and the means for comparing the second portion comprise a content addressable memory (CAM) device, that contains a plurality of CAM rows that store a data word chain, wherein the data word chain corresponds to the negative regular expression and spans multiple non-contiguous CAM rows.

22. The content search system of claim 21, further comprising:
means for enabling comparison between the second portion and the negative pattern only if the match signal indicates a match between the first portion and the positive pattern.

23. The content search system of claim 21, wherein the negative pattern is associated with an identifier that distinguishes the negative pattern from the positive pattern, and the identifier is the symbol combination ?^.

24. The content search system of claim 21, wherein the positive pattern is a first positive pattern, wherein the negative regular expression further includes a second positive pattern and the negative pattern is positioned between the first and second positive patterns within the negative regular expression, and wherein the input string is compared with the negative pattern and the second positive pattern at the same time.

* * * * *

UNITED STATES PATENT AND TRADEMARK OFFICE
CERTIFICATE OF CORRECTION

PATENT NO. : 8,527,488 B1
APPLICATION NO. : 12/832862
DATED : September 3, 2013
INVENTOR(S) : Alexei Starovoitov It is certified that error appears in the above-identified patent and that said Letters Patent is hereby corrected as shown below:

In the Claims

Claim 8, Column 17, Line 34, replace "word, chain" with --word chain--.

Claim 12, Column 17, Line 65, replace "data, word" with --data word--.

Claim 12, Column 17, Line 66, replace "rear" with --regular--.

Signed and Sealed this
Twelfth Day of November, 2013

Teresa Stanek Rea
*Deputy Director of the United States Patent and Trademark Office*